US 6,679,276 B1

(12) United States Patent  (10) Patent No.: US 6,679,276 B1
Brown et al.  (45) Date of Patent: *Jan. 20, 2004

(54) APPARATUS AND METHODS FOR WASHING THE CORED AREAS OF LETTUCE HEADS DURING HARVEST

(75) Inventors: Richard S. Brown, Chualar, CA (US); Eugene D. Rizzo, Pacific Grove, CA (US)

(73) Assignee: Fresh Express, Inc., Salinas, CA (US)

( * ) Notice: Subject to any disclaimer, the term of this patent is extended or adjusted under 35 U.S.C. 154(b) by 80 days.

This patent is subject to a terminal disclaimer.

(21) Appl. No.: 09/692,273

(22) Filed: Oct. 19, 2000

Related U.S. Application Data

(62) Division of application No. 09/295,438, filed on Apr. 20, 1999, now Pat. No. 6,298,865.

(51) Int. Cl.⁷ ................................................ B08B 3/02
(52) U.S. Cl. ........................ 134/68; 134/72; 134/126; 134/131; 134/166 R; 134/169 R; 134/171
(58) Field of Search ............................. 134/66, 67, 68, 134/70, 71, 72, 126, 127, 129, 130, 131, 133, 134, 166 R, 169 R, 170, 171

(56) References Cited

U.S. PATENT DOCUMENTS

| 804,170 | A | * | 11/1905 | Prince |
| 910,882 | A | | 1/1909 | Truesdell |
| 1,003,786 | A | * | 9/1911 | Pecht |

(List continued on next page.)

FOREIGN PATENT DOCUMENTS

| CA | 1025786 | | 2/1978 |
| DE | 266246 | * | 10/1913 |
| DE | 2842204 | | 4/1980 |
| DE | 3207646 | * | 9/1983 |
| EP | 025334 | | 1/1988 |
| FR | 624872 | * | 7/1927 |
| FR | 1077818 | * | 11/1954 |
| FR | 1132766 | * | 3/1957 |
| GB | 4534 | * | 10/1881 |
| GB | 7554 | * | 5/1907 |
| GB | 169864 | * | 7/1926 |
| GB | 402436 | | 12/1933 |
| GB | 650385 | * | 2/1951 |
| GB | 764796 | | 1/1957 |
| GB | 1378140 | | 12/1974 |
| JP | 60-126032 | | 7/1985 |

OTHER PUBLICATIONS

Wiley Encyclopedia of Packaging Technology J. Wiley & Sons, 1986 ppp. 24–29, 66–81.
Packaging, Japan, Nov. 198, pp. 17–22.
Chemical Engineering, vol. 64.
Modern Packaging, Aug. 1941, pp. 44, 45.
"The King PAK" eight sided fiberboard IBC from Packaging Review , May 1980, 1 page.
The Wiley Encyclopedia of Packaging Technology (WFPT), John Wiley & Sons, 1986, p. 493.

*Primary Examiner*—Frankie L. Stinson
(74) *Attorney, Agent, or Firm*—Patrick F. Bright; Bright & Lorig, P.C.

(57) ABSTRACT

An apparatus and method for washing a plurality of cored lettuce heads as they are harvested in the field is disclosed. The apparatus incorporates a multi-segment hinged conveyer forming a loop, at least one support platform having an opening, at least one lettuce head guide connected to the support platform and an aqueous solution spraying system. Workers harvest lettuce heads, core the lettuce heads and then place them on the lettuce head guides which are moving along the conveyer. The lettuce heads are conveyed to an aqueous solution spraying system which washes the cored areas of the lettuce heads. The lettuce heads are then removed from the conveyer into a produce bin.

35 Claims, 8 Drawing Sheets

U.S. PATENT DOCUMENTS

| | | | |
|---|---|---|---|
| 1,013,051 A | * | 12/1911 | Paul |
| 1,130,015 A | * | 3/1915 | Paul |
| 1,144,023 A | * | 6/1915 | Beutlich |
| 1,415,506 A | * | 5/1922 | Anstiss |
| 1,445,359 A | * | 2/1923 | Scarborough et al. |
| 1,513,628 A | * | 10/1924 | Risser |
| 1,648,743 A | * | 11/1927 | Sheffield |
| 1,661,602 A | | 3/1928 | Dary |
| 2,003,326 A | | 6/1935 | Wellman |
| 2,011,107 A | * | 8/1935 | Lape, Jr. |
| 2,156,840 A | | 5/1939 | Davis |
| 2,170,378 A | | 8/1939 | Orstrom |
| 2,196,846 A | * | 4/1940 | Andrus |
| 2,214,944 A | | 9/1940 | Vogt |
| 2,294,668 A | | 9/1942 | Karas |
| 2,322,417 A | | 6/1943 | Christian |
| 2,335,913 A | | 12/1943 | Buttery |
| 2,367,652 A | * | 1/1945 | Trier et al. |
| 2,379,789 A | * | 7/1945 | Cozzoli |
| 2,417,634 A | * | 3/1947 | Cozzoli |
| 2,424,693 A | | 7/1947 | Jones |
| 2,427,840 A | * | 9/1947 | Davis |
| 2,431,988 A | * | 12/1947 | Cozzli |
| 2,455,675 A | * | 12/1948 | Hawk |
| 2,489,166 A | * | 11/1949 | Timm et al. |
| 2,611,709 A | | 9/1952 | Plagge |
| 2,627,862 A | | 2/1953 | Flusher |
| 2,784,120 A | * | 3/1957 | Hagedorn |
| 2,815,621 A | | 12/1957 | Carter |
| 2,895,548 A | * | 7/1959 | Stafford |
| 2,920,967 A | | 1/1960 | Heinemann |
| 2,925,210 A | | 2/1960 | Fallert |
| 2,955,940 A | | 10/1960 | Williams |
| 2,967,777 A | | 1/1961 | Grindrod |
| 3,055,568 A | | 9/1962 | Zalking |
| 3,056,414 A | * | 10/1962 | Nolte |
| 3,059,654 A | * | 10/1962 | Weiner |
| 3,094,997 A | * | 6/1963 | Nolte et al. |
| 3,128,934 A | | 4/1964 | Jacke |
| 3,179,117 A | * | 4/1965 | Gibson et al. |
| 3,203,437 A | | 8/1965 | Faust |
| 3,204,825 A | | 9/1965 | Underwood |
| 3,220,157 A | | 11/1965 | Buchner |
| 3,225,776 A | * | 12/1965 | Plock et al. |
| 3,261,533 A | | 7/1966 | Ripking |
| 3,308,838 A | * | 3/1967 | Nolte |
| 3,407,078 A | | 10/1968 | Schlichter |
| 3,419,400 A | | 12/1968 | Hayhurst et al. |
| 3,450,542 A | | 6/1969 | Badran |
| 3,473,589 A | | 10/1969 | Gotz |
| 3,484,017 A | | 12/1969 | O'Donnell |
| 3,521,806 A | | 7/1970 | Esty |
| 3,537,899 A | * | 11/1970 | Yatuni |
| 3,561,459 A | * | 2/1971 | Ciongwa et al. |
| 3,664,355 A | * | 5/1972 | Adams |
| 3,715,860 A | | 2/1973 | Esty |
| 3,747,614 A | | 7/1973 | Buedingen |
| 3,798,465 A | * | 3/1974 | Guth |
| 3,922,750 A | * | 12/1975 | Cioni et al. |
| 3,938,532 A | * | 2/1976 | Babunovic |
| 3,939,287 A | | 2/1976 | Orwig et al. |
| 3,945,558 A | | 3/1976 | Elder |
| 3,955,588 A | * | 5/1976 | Born |
| 3,957,179 A | | 5/1976 | Bamburg et al. |
| 3,990,358 A | | 11/1976 | Cade |
| 3,991,543 A | | 11/1976 | Shaw |
| 4,001,443 A | | 1/1977 | Dave |
| 4,006,561 A | | 2/1977 | Thoma et al. |
| 4,039,350 A | | 8/1977 | Bucy et al. |
| 4,055,931 A | | 11/1977 | Myers |
| 4,061,785 A | | 12/1977 | Nishino et al. |
| 4,066,401 A | | 1/1978 | Solomon |
| 4,079,152 A | | 3/1978 | Bedrosian et al. |
| 4,089,417 A | | 5/1978 | Osborne |
| 4,105,153 A | | 8/1978 | Locke |
| 4,165,756 A | * | 8/1979 | Sorch et al. |
| 4,168,597 A | | 9/1979 | Cayton |
| 4,209,538 A | | 6/1980 | Woodruff |
| 4,224,347 A | | 9/1980 | Woodruff |
| 4,241,558 A | | 12/1980 | Gidewall et al. |
| 4,258,848 A | | 3/1981 | Akao et al. |
| 4,268,555 A | | 5/1981 | Kantz |
| 4,296,860 A | | 10/1981 | Hsu et al. |
| 4,343,429 A | | 8/1982 | Cherry |
| 4,365,383 A | * | 12/1982 | Bartlett |
| 4,411,921 A | | 10/1983 | Woodruff |
| 4,422,466 A | | 12/1983 | Schafer |
| 4,423,080 A | | 12/1983 | Bedrosian et al. |
| 4,454,945 A | | 6/1984 | Jabarin et al. |
| 4,515,266 A | | 5/1985 | Myers |
| 4,516,692 A | | 5/1985 | Croley |
| 4,610,885 A | | 9/1986 | Tait |
| 4,670,227 A | | 6/1987 | Smith |
| 4,702,408 A | | 10/1987 | Powlenko |
| 4,744,199 A | | 5/1988 | Gannon |
| 4,744,203 A | | 5/1988 | Brockwell et al. |
| 4,756,417 A | | 7/1988 | Teixeira |
| 4,759,642 A | | 7/1988 | Van Erden et al. |
| 4,813,791 A | | 3/1989 | Cullen et al. |
| 4,840,271 A | | 6/1989 | Garwood |
| 4,863,287 A | | 9/1989 | Marsik |
| 4,886,372 A | | 12/1989 | Greengrass et al. |
| 4,930,906 A | | 6/1990 | Hemphill |
| 4,962,777 A | | 10/1990 | Bell |
| 4,963,287 A | | 10/1990 | Hutchings et al. |
| 4,967,776 A | | 11/1990 | Folmar |
| 5,044,776 A | | 9/1991 | Schramer et al. |
| 5,078,509 A | | 1/1992 | Center et al. |
| 5,093,080 A | | 3/1992 | Keller |
| 5,121,589 A | | 6/1992 | Ventura et al. |
| 5,226,972 A | | 7/1993 | Bell |
| 5,290,580 A | | 3/1994 | Floyd et al. |
| 5,316,778 A | | 5/1994 | Hougham |
| 5,346,089 A | | 9/1994 | Brown et al. |
| 5,354,569 A | | 10/1994 | Brown et al. |
| 5,402,906 A | | 4/1995 | Brown et al. |
| 5,421,250 A | | 6/1995 | Beaumont |
| 5,437,731 A | | 8/1995 | St. Martin |
| 5,522,410 A | | 6/1996 | Meilleur |
| 5,640,643 A | * | 6/1997 | Hoitz et al. |
| 5,713,101 A | | 2/1998 | Jackson |
| 5,727,690 A | | 3/1998 | Hofmeister |
| 5,728,439 A | | 3/1998 | Carlblom et al. |
| 5,803,984 A | * | 9/1998 | Lordo et al. |
| 5,885,002 A | | 3/1999 | Reiss |
| 5,915,397 A | * | 6/1999 | Cord et al. |
| 5,954,067 A | | 9/1999 | Brown et al. |
| 6,041,797 A | | 3/2000 | Casselman |
| 6,196,237 B1 | | 3/2001 | Brown et al. |

\* cited by examiner

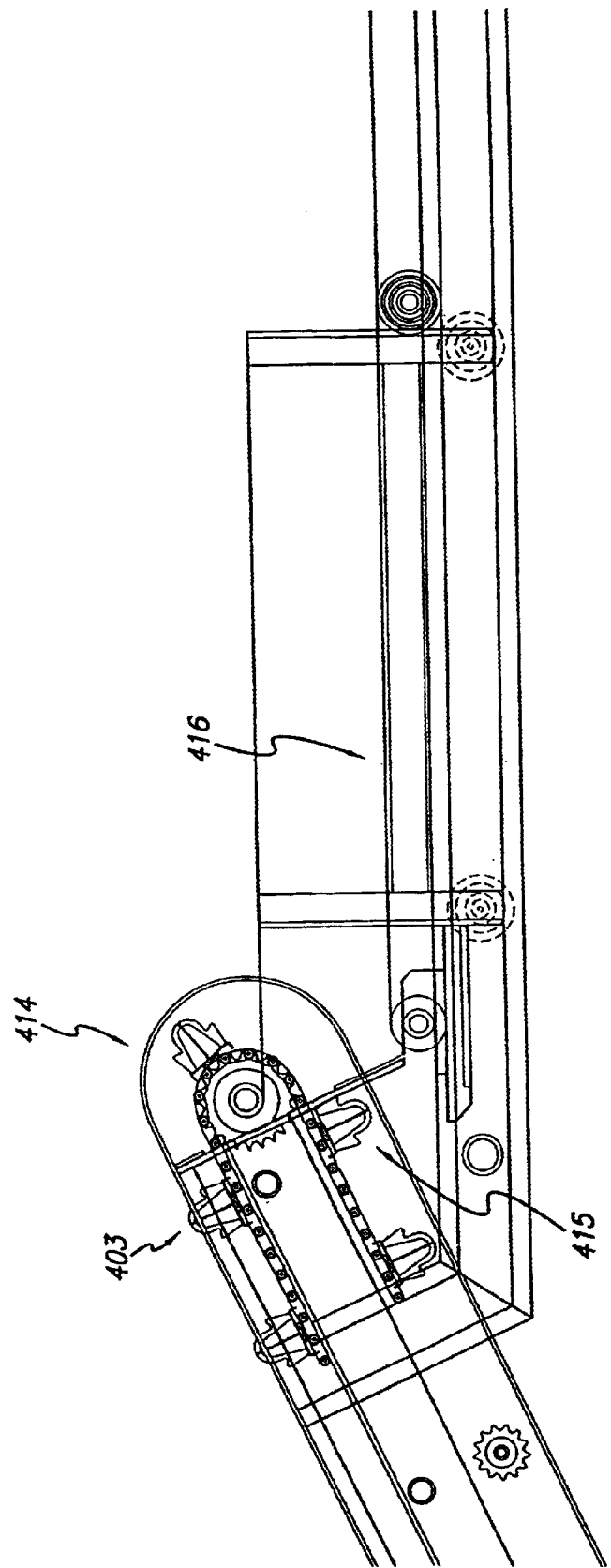

APPARATUS AND METHODS FOR WASHING THE CORED AREAS OF LETTUCE HEADS DURING HARVEST

This application is a divisional of Ser. No. 09/295,438, filed Apr. 20, 1999, now U.S. Pat. No. 6,298,862

BACKGROUND OF THE INVENTION

This invention relates to apparatus and methods for washing the cored area of a lettuce head.

The field to which the invention relates is that of agricultural equipment and methods used in harvesting operations.

BRIEF SUMMARY OF THE INVENTION

The invention is an apparatus and method for washing a plurality of cored lettuce heads as they are harvested in the field. The apparatus comprises a conveyer forming a loop, support platforms attached to the conveyer with at least one lettuce head guide connected to each support platform, and an aqueous solution spraying system fixedly attached at a point along said conveyer loop. The claimed method involves the steps of placing at least one cored lettuce head onto a conveyer, conveying the lettuce head(s) to an aqueous solution spraying system, delivering an aqueous solution into the core hole(s) of the lettuce head(s) for a time and at a pressure sufficient to wash the core hole(s), and removing the cored lettuce head(s) from the conveyer.

BRIEF DESCRIPTION OF THE DRAWINGS

FIG. 7 is an exploded side elevation view in cross section of the unhinged end of the proximal end segment in the apparatus of FIG. 6.

DETAILED DESCRIPTION OF THE INVENTION

Figure 1:
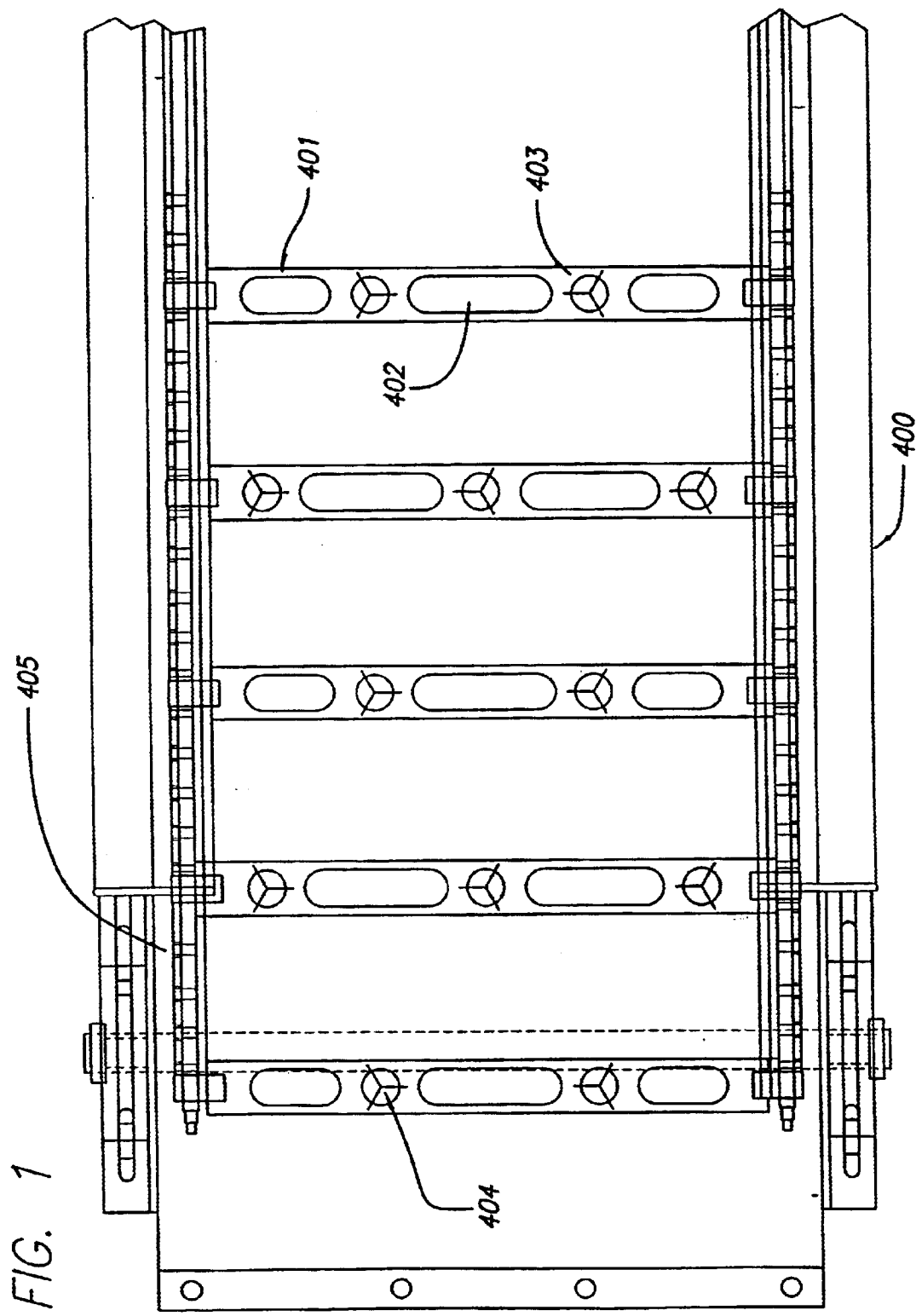
FIG. 1 is a side elevation view of the apparatus for washing the cores of cored lettuce attached to a tractor.
Figure 3:
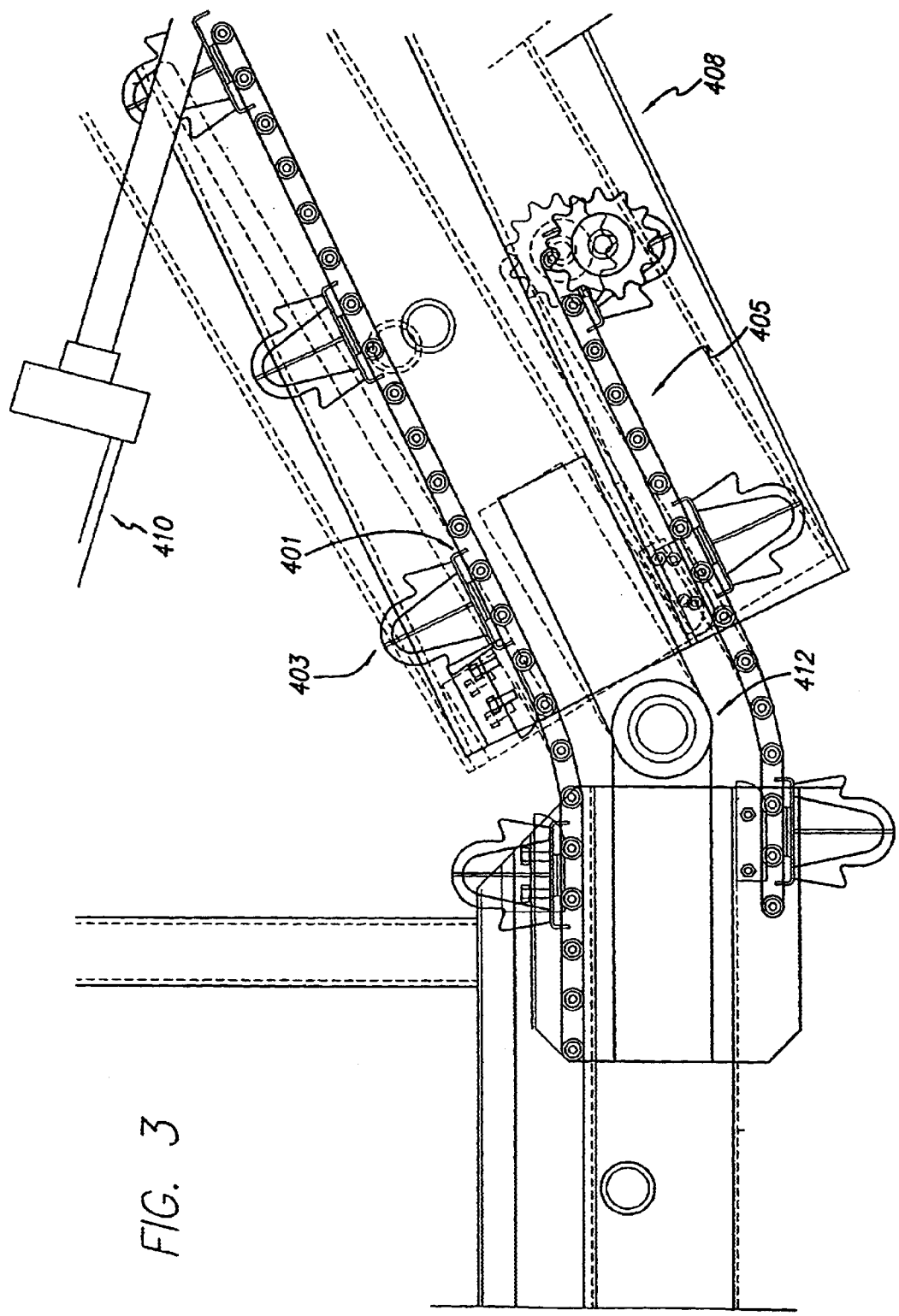
FIG. 3 is an exploded side elevation view in cross section of the hinged area connecting the middle and proximal end segments of the apparatus shown in FIG. 1.
Figure 4:
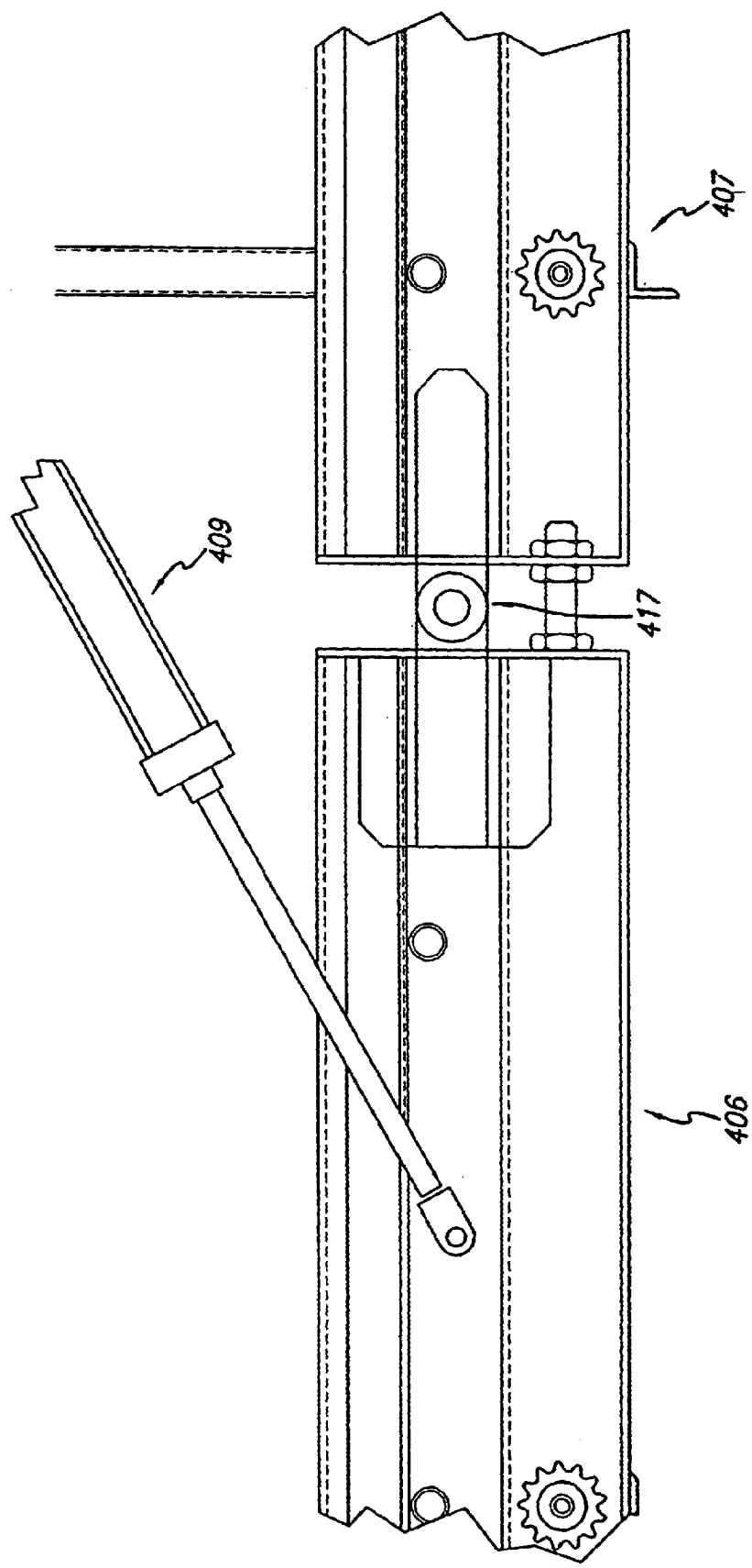
FIG. 4 is an exploded side elevation view in cross section of the hinged area connecting the central and distal end segments of the apparatus shown in FIG. 1.

FIG. 1 shows an embodiment of washing apparatus 400 which includes three hinged sections—a distal end segment 406, a middle segment 407, and a proximal end segment 408. Lifting cylinders 409 and 410, powered and controlled hydraulically, rotate distal end segment 406 and proximal end segment 408 to desired angles of inclination. See FIGS. 3 and 4 for an example. Washing chamber 411 is located on proximal end segment 408 adjacent to connecting hinge 412.

Figure 2:
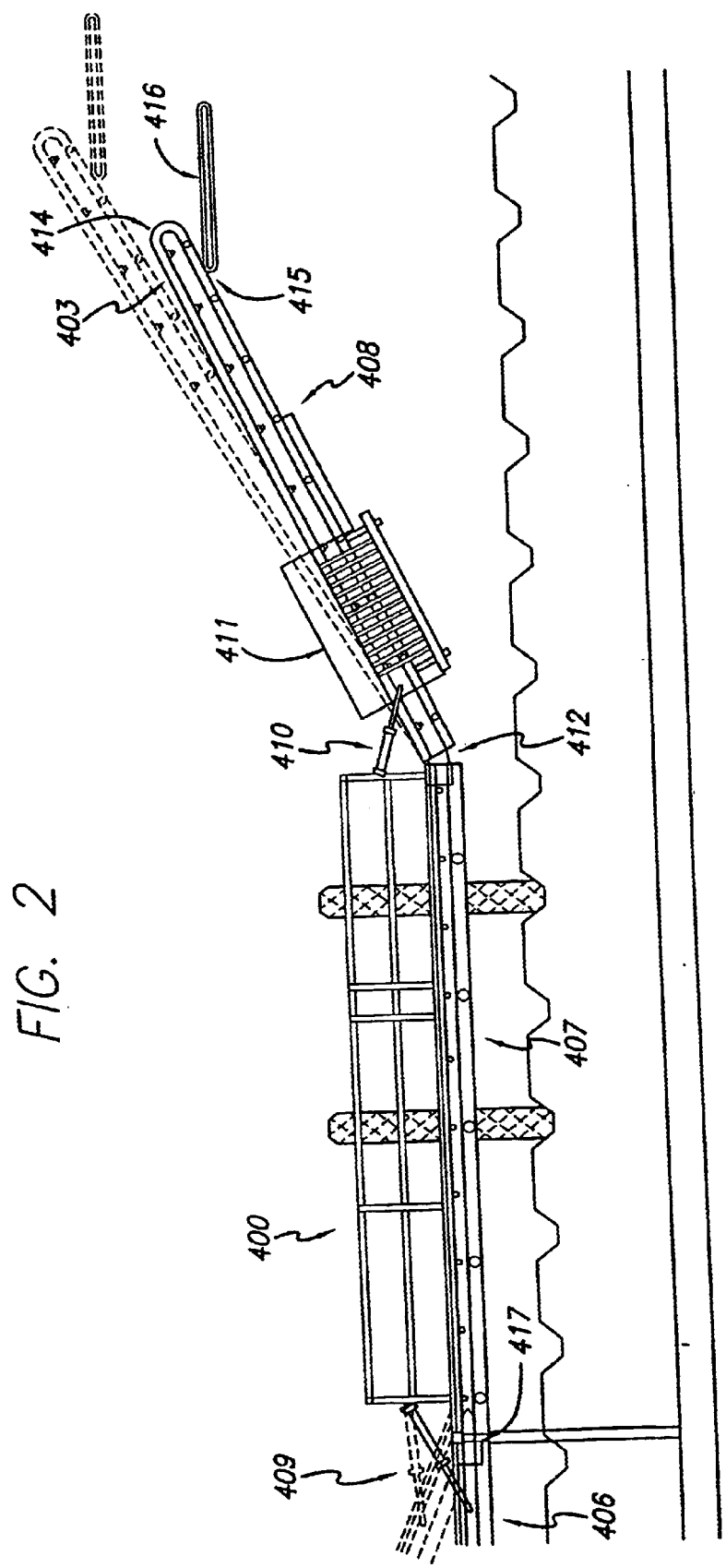
FIG. 2 shows a top plan view of a section of the apparatus of FIG. 1.

FIG. 2 shows lettuce head washing apparatus 400 as viewed from above. Apparatus 400 includes at least one support platform 401 which includes a plurality of openings 402. Platforms 401 support and are connected to guides 403. Guides 403 orient the lettuce heads so that the aqueous solution is delivered to the core holes of the lettuce heads. In FIG. 2, a preferred embodiment of guide 403 is shown as including three L-shaped vanes 404, that project upwardly from platforms 401. Guides 403 may also be circular, posts, spikes, or any other suitable holder used to support and orient the lettuce heads.

Figure 6:
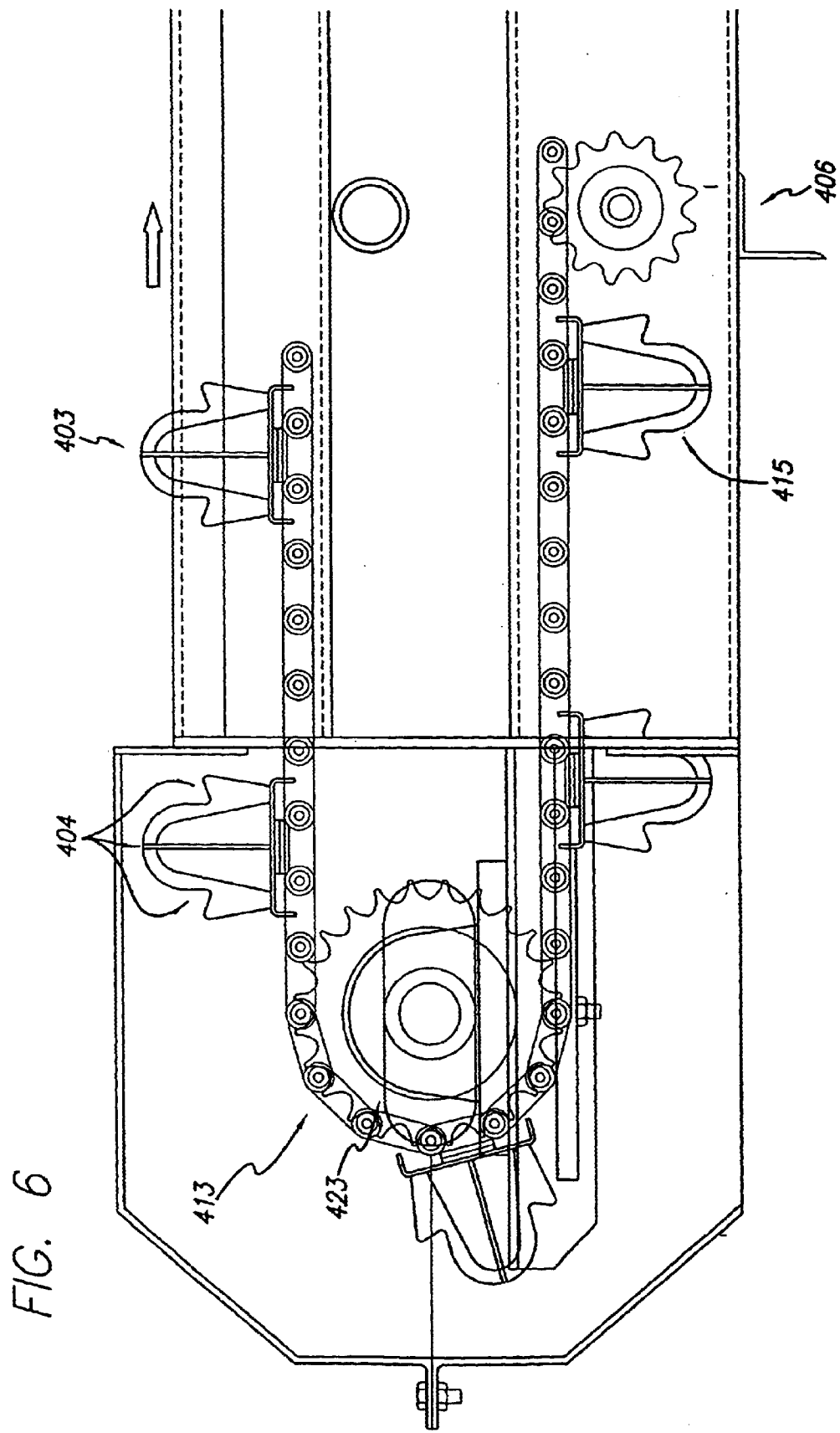
FIG. 6 is an exploded side elevation view in cross section of the unhinged end of the distal end segment in the apparatus of FIGS. 1–5.

Platform 401 is attached at each end to a double pitch chain 405 that forms a loop. Preferably, apparatus 400 includes a plurality of support platforms 401, each with at least two guides 403, attached at intervals along chain 405, such as shown in FIG. 2. In some embodiments platforms 401 are detachable from chain 405. The combination of guides 403, platforms 401, chains 405 and associated frame and driving mechanisms form a looped belt, sometimes called a harvester belt, that moves along an elliptical or other path. Sprockets 423, as shown for example in FIG. 6, are powered and controlled hydraulically to move chain 405, thereby moving attached platforms 401 and connected guides 403. Preferably the belt is attached, at one end, to a hitch of a puller vehicle e.g. a tractor of 40 horse power or greater.

Guides 403 are conveyed in a substantially upright position from unhinged end 413 of distal end segment 406 towards unhinged end 414 of proximal end segment 408. In a preferred embodiment distal end segment 406 is maintained in a horizontal and co-linear position with middle segment 407 during operation. Workers place cored heads of lettuce on guides 403 as they traverse distal end segment 406 and central segment 407 in an upright position. Cored lettuce heads on guides 403 then travel through wash chamber 411 to unhinged end 414 of proximal end segment 408.

Figure 5:
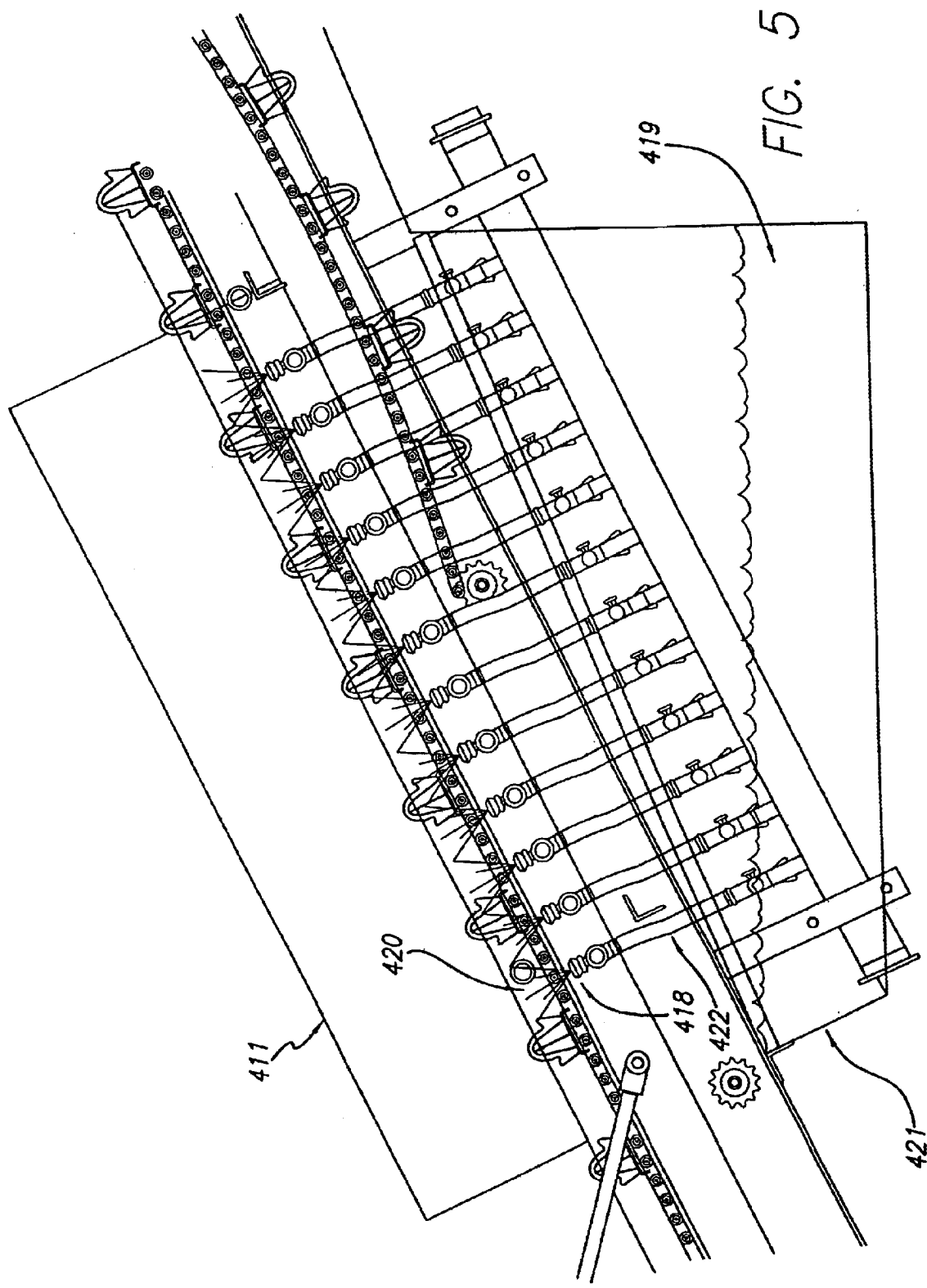
FIG. 5 is a side elevation view in cross section of the wash chamber in the apparatus of FIGS. 1–4.

FIG. 5 shows wash chamber 411. Wash chamber 411 includes one or more spray nozzles 418 that continually spray or otherwise deliver an aqueous lettuce head washing solution 419 into the core holes of the lettuce heads as they travel over nozzles 418. Solution 419 is pumped to nozzles 418 through hoses 422 from supply tank 421 located below wash chamber 411. Solution 419 may be pumped by any suitable pump. Preferred embodiments use a centrifugal pump powered and controlled hydraulically. Solution 419 emerges from nozzles 418 under pressure and travels upward as spray 420 through openings in platforms 401 into the core holes of lettuce heads. Solution 419 which drains from the lettuce is collected, filtered, and recycled by supply tank 421. A preferred embodiment of supply tank 421 used to collect, filter and recycle solution 419 is disclosed in the currently pending U.S. patent application No. 09/144,972 filed Sep. 1$^{st}$, 1998 by applicants Richard S. Brown and Eugene D. Rizzo. That application is hereby incorporated by reference.

The level of solution in supply tank 421 is kept at a predetermined level by a float valve. Supply tank 421 may be connected to a tractor mounted nurse tank. Aqueous solution 419 may be pumped from the nurse tank to supply tank 421 by any pump. Preferred embodiments use a centrifugal pump, powered and controlled hydraulically.

In some embodiments, a single lettuce head passes over one or more nozzles 418, repeatedly washing the core hole. Nozzles 418 may deliver washing solution 419 at either high pressure and low volume, or low pressure and high volume. Preferred embodiments include both types of nozzles 418.

Figure 9:
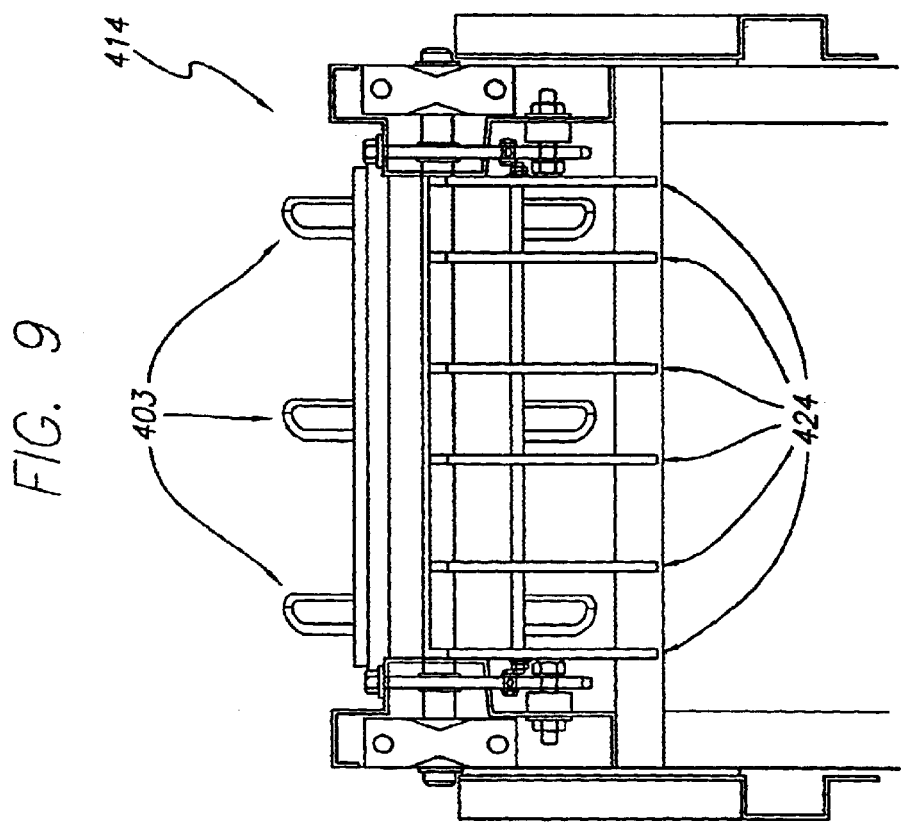
FIG. 9. is an end view of the unhinged end of the proximal end segment showing the removal fingers.
Figure 8:
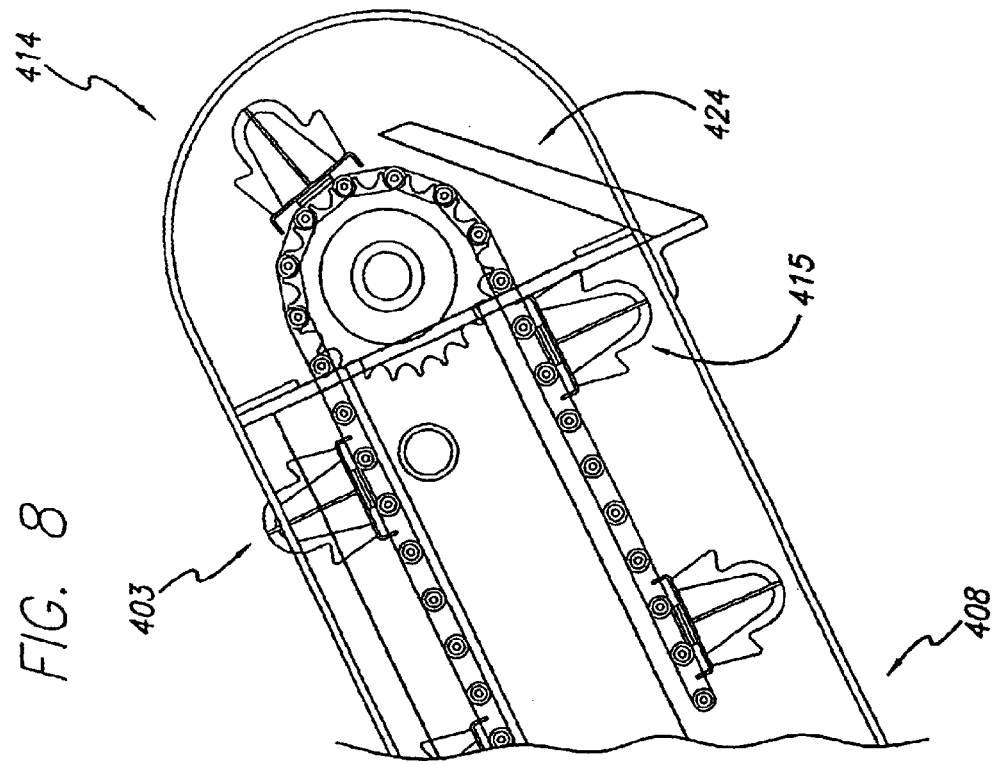
FIG. 8 is an exploded side elevation view in cross section of the unhinged end of the proximal end segment in the apparatus of FIG. 6 showing a removal finger.

After exiting washing chamber 411, the lettuce heads are conveyed to unhinged end 414 of proximal end segment 408. Proximal end segment 408 is preferably elevated, as shown in FIG. 1, at an inclination angle of 25–35 degrees. The washed lettuce heads will thereby be elevated for deposit onto a conveyer or into produce bins. At unhinged end 414 the cored lettuce heads on guides 403 are rotated through an angle to a substantially inverted position 415, as shown, for example, in FIG. 7. In inverted position 415 the cored lettuce heads detach from guide 403. At least one fixed removing finger 424, as shown, for example, in FIGS. 8 and 9, placed adjacent to unhinged end 414 may be used to assist in unseating the lettuce heads. Inverted guides 403 return to unhinged distal end 413 of the harvester belt. There guides 403 rotate through an angle to a substantially upright position. For an example, see FIG. 6. Guide 403 then travels back towards proximal end 408 of the harvester belt for receipt of additional cored lettuce heads to be washed.

What is claimed is:

1. An apparatus for washing a plurality of cored heads of lettuce comprising:
    a conveyer forming a loop with a distal end and a proximal end;
    at least one support platform having at least one opening;
    said at least one support platform attached to said conveyer;
    at least one lettuce head guide connected to said at least one support platform;
    an aqueous solution spraying system fixedly attached at a point along said conveyer loop, said conveyer further comprising:
        a middle segment with a first end and a second end;
        a distal end segment rotatably attached to said first end;
        a proximal end segment rotatably attached to said second end;
        a rotator to rotate and hold in place at a desired angle said distal end segment; and
        a rotator to rotate and hold in place at a desired angle said proximal end segment.

2. The apparatus of claim 1 wherein said aqueous solution spraying system is fixedly attached at a point along said proximal end segment.

3. The apparatus of claim 1 or claim 2 wherein said conveyer further comprises a double pitch attachment style chain.

4. An apparatus for washing a plurality of cored heads of lettuce comprising:
    a conveyer of a loop with a distal end and a proximal end;
    at least one support platform having at least one opening;
    said at least one support platform attached to said conveyer;
    said conveyer comprising;
        (1) a middle segment with a first end and a second end;
        (2) a distal end segment rotatably attached to said first end;
        (3) a proposal end segment rotatably attached to said second end;
        (4) a rotator to rotate and hold in place at a desired angle said distal end segment; and
        (5) a rotator to rotate and hold in place at a desired angle said proximal end segment;
    at least one lettuce head guide connected to said at least one support platform;
    said lettuce head guide comprising outward facing vanes; and
    an aqueous solution spraying system fixedly attached at a point along said conveyer loop.

5. An apparatus for washing a plurality of cored heads of lettuce comprising:
    a conveyer forming a loop with a distal end and a proximal end;
    at least one support platform having at least one opening;
    said at least one support platform attached to said conveyer through a double pitch attachment style chain;
    said conveyer comprising;
        (1) a middle segment with a first end and a second end;
        (2) a distal end segment rotatably attached to said first end;
        (3) a proximal end segment rotatably attached to said second end;
        (4) a rotator to rotate and hold in place at a desired angle said distal end segment; and
        (5) a rotator to rotate and hold in place at a desired angle said proximal end segment;
    at least one lettuce head guide connected to said at least one support platform;
    said lettuce head guide comprising outward facing vanes; and
    an aqueous solution spraying system fixedly attached at a point along said conveyer loop.

6. An apparatus for washing a plurality of cored heads of lettuce comprising:
    a conveyer forming a loop with a distal end and a proximal end;
    at least one support platform having at least one opening;
    said at least one support platform attached to said conveyer;
    said conveyer comprising;
        (1) a middle segment with a first end and a second end;
        (2) a distal end segment rotatably attached to said first end;
        (3) a proximal end segment rotatably attached to said second end;
        (4) a rotator to rotate and hold in place at a desired angle said distal end segment; and
        (5) a rotator to rotate and hold in place at a desired angle said proximal end segment;
    at least one lettuce head guide connected to said at least one support platform;
    said lettuce head guide comprising outward facing vanes; and
    an aqueous solution spraying system fixedly attached at a point along said proximal end segment.

7. An apparatus for washing a plurality of cored heads of lettuce comprising:
    a conveyer forming a loop with a distal end and a proximal end;
    at least one support platform having at least one opening;
    said at least one support platform attached through a double pitch attachment style chain to said conveyer;
    said conveyer comprising;
        (1) a middle segment with a first end and a second end;
        (2) a distal end segment rotatably attached to said first end;
        (3) a proximal end segment rotatably attached to said second end;
        (4) a rotator to rotate and hold in place at a desired angle said distal end segment; and
        (5) a rotator to rotate and hold in place at a desired angle said proximal end segment;
    at least one lettuce head guide connected to said at least one support platform;

said lettuce head guide comprising outward facing vanes; and an aqueous solution spraying system fixedly attached at a point along said proximal end segment.

8. An apparatus for washing a plurality of cored heads of lettuce comprising:

a conveyer forming a loop with a distal end and a proximal end, at least one support platform having at least one opening;

said at least one support platform attached to said conveyer;

said conveyer comprising;
(1) a middle segment with a first end and a second end,
(2) a distal end segment rotatably attached to said first end;
(3) a proximal end segment rotatably attached to said second end;
(4) a rotator to rotate and hold in place at a desired angle said distal end segment; and
(5) a rotator to rotate and hold in place at a desired angle said proximal end segment;

at least one lettuce head guide connected to said at least one support platform;

said lettuce head guide comprising an elliptical ring; and an aqueous solution spraying system fixedly attached at a point along said conveyer loop.

9. An apparatus for washing a plurality of cored heads of lettuce comprising:

a conveyer forming a loop with a distal end and a proximal end;

at least one support platform having at least one opening;

said at least one support platform attached to said conveyer through a double pitch attachment style chain;

said conveyer comprising;
(1) a middle segment with a first end and a second end,
(2) a distal end segment rotatably attached to said first end,
(3) a proximal end segment rotatably attached to said second end;
(4) a rotator to rotate and hold in place at a desired angle said distal end segment; and
(5) a rotator to rotate and hold in place at a desired angle said proximal end segment;

at least one lettuce head guide connected to said at least one support platform;

said lettuce head guide comprising an elliptical ring; and an aqueous solution spraying system fixedly attached at a point along said conveyer loop.

10. An apparatus for washing a plurality of cored heads of lettuce comprising:

a conveyer forming a loop with a distal end and a proximal end;

at least one support platform having at least one opening;

said at least one support platform attached to said conveyer;

said conveyer comprising;
(1) a middle segment with a first end and a second end;
(2) a distal end segment rotatably attached to said first end;
(3) a proximal end segment rotatably attached to said second end;
(4) a rotator to rotate and hold L place at a desired angle said distal end segment; and
(5) a rotator to rotate and hold in place at a desired angle said proximal end segment;

at least one lettuce head guide connected to said at least one support platform;

said lettuce head guide comprising an elliptical ring; and an aqueous solution spraying system fixedly attached at a point along said proximal end segment.

11. An apparatus for washing a plurality of cored heads of lettuce comprising:

a conveyer forming a loop with a distal end and a proximal end;

at least one support platform having at least one opening;

said at least one support platform attached through a double pitch attachment style chain to said conveyer;

said conveyer comprising;
(1) a middle segment with a first end and a second end;
(2) a distal end segment rotatably attached to said first end;
(3) a proximal end segment rotatably attached to said second end;
(4) a rotator to rotate and hold in place at a desired angle said distal end segment; and
(5) a rotator to rotate and hold in place at a desired angle said proximal end segment;

at least one lettuce head guide connected to said at least one support platform;

said lettuce head guide comprising an elliptical ring; and an aqueous solution spraying system fixedly attached at a point along said proximal end segment.

12. An apparatus for washing a plurality of cored heads of lettuce comprising:

a conveyer for g a loop with a distal end and a proximal end;

at least one support platform having at least one opening;

said at least one support platform attached to said conveyer;

said conveyer comprising;
(1) a middle segment with a first end and a second end;
(2) a distal end segment rotatably attached to said first end;
(3) a proximal end segment rotatably attached to said second end;
(4) a rotator to rotate and hold in place at a desired angle said distal end segment; and
(5) a rotator to rotate and hold in place at a desired angle said proximal end segment;

at least one lettuce head guide connected to said at least one support platform;

said lettuce head guide comprising a spike; and an aqueous solution spraying system fixedly attached at a point along said conveyer loop.

13. An apparatus for washing a plurality of cored heads of lettuce comprising:

a conveyer forming a loop with a distal end and a proximal end;

at least one support platform having at least one opening;

said at least one support platform attached to said conveyer through a double pitch attachment style chain;

said conveyer comprising;
(1) a middle segment with a first end and a second end;
(2) a distal end segment rotatably attached to said first end;
(3) a proximal end segment rotatably attached to said second end;
(4) a rotator to rotate and hold in place at a desired angle said distal end segment; and (5) a rotator to rotate and hold in place at a desired angle said proximal end segment;

at least one lettuce head guide connected to said at least one support platform;

said lettuce head guide comprising a spike; and an aqueous solution spraying system fixedly attached at a point along said conveyer loop.

14. An apparatus for washing a plurality of cored heads of lettuce comprising:

a conveyer forming a loop with a distal end and a proximal end;

at least one support platform having at least one opening;

said at least one support platform attached to said conveyer;

said conveyer comprising;
(1) a middle segment with a first end and a second end;
(2) a distal end segment rotatably attached to said first end;
(3) a proximal end segment rotatably attached to said second end,
(4) a rotator to rotate and hold ill place at a desired angle said distal end segment; and
(5) a rotator to rotate and hold in place at a desired angle said proximal end segment;

at least one lettuce head guide connected to said at least one support platform;

be said lettuce head guide comprising a spike; and an aqueous solution spraying system fixedly attached at a point along said proximal end segment.

15. An apparatus for washing a plurality of cored heads of lettuce comprising:

a conveyer forming a loop with a distal end and a proximal end;

at least one support platform having at least one opening;

said at least one support platform attached through a double pitch attachment style chain to said conveyer;

said conveyer comprising;
(1) a middle segment with a first end and a second end;
(2) a distal end segment rotatably attached to said first end,
(3) a proximal end segment rotatably attached to said second end,
(4) a rotator to rotate and hold in place at a desired angle said distal end segment; and
(5) a rotator to rotate and hold in place at a desired angle said proximal end segment;

at least one lettuce head guide connected to said at least one support platform;

said lettuce head guide comprising a spike; and an aqueous solution spraying system fixedly attached at a point along said proximal end segment.

16. An apparatus for washing a plurality of cored heads of lettuce comprising:

a conveyer forming a loop with a distal end and a proximal end;

at least one support platform having at least one opening;

said at least one support platform attached to said conveyer;

at least one lettuce head guide connected to said at least one support platform;

an aqueous solution spraying system fixedly attached at a point along said conveyer loop;

said aqueous solution spraying system comprising;

a tank for holding an aqueous solution;

a pump;

said pump delivering said aqueous solution under pressure to at least two nozzles at least one of which delivers said aqueous solution at a high pressure and a low volume and at least one of which delivers said aqueous solution at a low pressure and a high volume.

17. An apparatus for washing a plurality of cored heads of lettuce comprising:

a conveyer for said lettuce heads;

at least one support platform having at least one opening;

said at least one support platform attached to said conveyer;

at least one cored lettuce head holder connected to said at least one support platform; and a wash spraying system for said cored heads attached along said conveyer, said wash spraying system located outside the cores of said cored heads of lettuce and comprising at least one wash spray nozzle positioned to deliver wash spray to said cores from a location substantially outside said cores.

18. The apparatus of claim 17 wherein said lettuce head guide holder comprises outward facing vanes.

19. The apparatus of claim 17 wherein said lettuce head guide holder comprises an elliptical; ring.

20. The apparatus of claim 17 wherein said lettuce head guide holder comprises a spike.

21. The apparatus of claim 17 wherein said wash spraying system comprises:

a tank for holding a wash liquid and a pump connected to said at least one nozzle;

said pump delivering said wash liquid under pressure to said at least one nozzle.

22. The apparatus of claim 21 wherein said wash spraying system also comprises:

a determiner of a level of said wash liquid in said tank, inlet valve, and a reservoir for said wash liquid;

said determiner connected to said valve;

said inlet valve also connected to said reservoir containing said wash liquid.

23. The apparatus of claim 21 or claim 22 wherein said at least one nozzle delivers said wash liquid at a high pressure and a low volume.

24. The apparatus of claim 21 further comprising at least two nozzles, at least one of which delivers said wash liquid at a high pressure and a low volume, and at least one of which delivers said wash liquid at a low pressure and a high volume.

25. The apparatus of claim 17 wherein said wash spraying system dispenses an aqueous liquid.

26. The apparatus of claim 17 wherein said wash spraying system dispenses au aqueous liquid washing spray.

27. The apparatus of claim 17 wherein said at least one lettuce head holder is movable to a first position in which said holder supports a lettuce head, and to a second position in which said holder releases said lettuce head.

28. The apparatus of claim 17 wherein said wash spraying system further comprises a pressurizable chamber and at least one timer that controls the time for wash liquid to flow into said pressurizable chamber.

29. The apparatus of claim 17 wherein said wash spraying system further comprises at least one chamber and at least one timer to control flow of wash liquid from said chamber into the core hole of a cored lettuce head supported by said lettuce head holder.

30. The apparatus of claim 17 wherein said wash spraying system further comprises at least one timer to control the time for releasing a lettuce head from said holder.

31. The apparatus of claim 17 further comprising at least one timer to control the time of a wash cycles and the time interval between one wash cycle and another wash cycle.

32. An apparatus for washing a plurality of cored heads of lettuce comprising:

- a conveyer for said lettuce heads;
- at least one support platform having at least one opening;
- said at least one support platform attached to said conveyer;
- at least one cored lettuce head holder connected to said at least one support platform; and
- a wash spraying system for said cored heads attached along said conveyer comprising a pressurizable chamber and at least one timer that controls the time for wash spray to flow into said pressurizable chamber.

33. An apparatus for washing a plurality of cored heads of lettuce comprising:

- a conveyer for said lettuce heads;
- at least one support platform having at least one opening;
- said at least one support platform attached to said conveyer;
- at least one cored lettuce head holder connected to said at least one support platform; and
- a wash spraying system for said cored heads attached along said conveyer comprising at least one timer to control the time for releasing a lettuce head from said holder.

34. An apparatus for washing a plurality of cored heads of corable green leafy vegetables comprising:

- a conveyer for said heads comprising at least one cored head holder;
- a wash spraying system for said cored heads attached along said conveyer, said wash spraying system located outside the cores of said cored heads of lettuce and comprising at least one wash spray nozzle positioned to deliver wash spray water to said cores from a location substantially outside said cores on said at least one cored head holder;
- a tank for holding said wash spray and a pump connected to said at least one wash spray nozzle;
- said pump delivering said wash spray tinder pressure to said at least one wash spray nozzle; and
- at least one timer to control the time of a wash cycle, and the time interval between one wash cycle and another wash cycle.

35. An apparatus for washing a plurality of cored heads of corable green leafy vegetables comprising;

- a conveyer for said heads comprising at least two cored head holders;
- a wash spraying system for said cored heads attached along said conveyer, said wash spraying system located outside the cores of said cored heads of lettuce and comprising at least two wash spray nozzles positioned to deliver wash spray water to said cores from locations substantially outside said cores on said at least two cored head holders; and
- at least one of said wash spray nozzles delivering said wash spray at a first pressure and a first volume, and at least one of said wash spray nozzles delivering said wash spray at a second, lower pressure than said first pressure, and a second, higher volume than said first volume.

* * * * *